Feb. 5, 1929.

R. H. LANGLEY 1,701,377

INDICATING DEVICE

Filed Dec. 1, 1925

Inventor:
Ralph H. Langley.
by
His Attorney.

Patented Feb. 5, 1929.

1,701,377

UNITED STATES PATENT OFFICE.

RALPH H. LANGLEY, OF SCHENECTADY, NEW YORK, ASSIGNOR TO GENERAL ELECTRIC COMPANY, A CORPORATION OF NEW YORK.

INDICATING DEVICE.

Application filed December 1, 1925. Serial No. 72,594.

My present invention relates to indicating devices suitable for use in connection with signal receiving apparatus, and more particularly to devices which are especially adapted for use in connection with apparatus intended for the reception of broadcast radio signals.

The object of my invention is to provide a means whereby the operator of a receiving set may be enabled to adjust the set at will for the reception of signals of any desired frequency within the operating range of the set.

Figure 1:
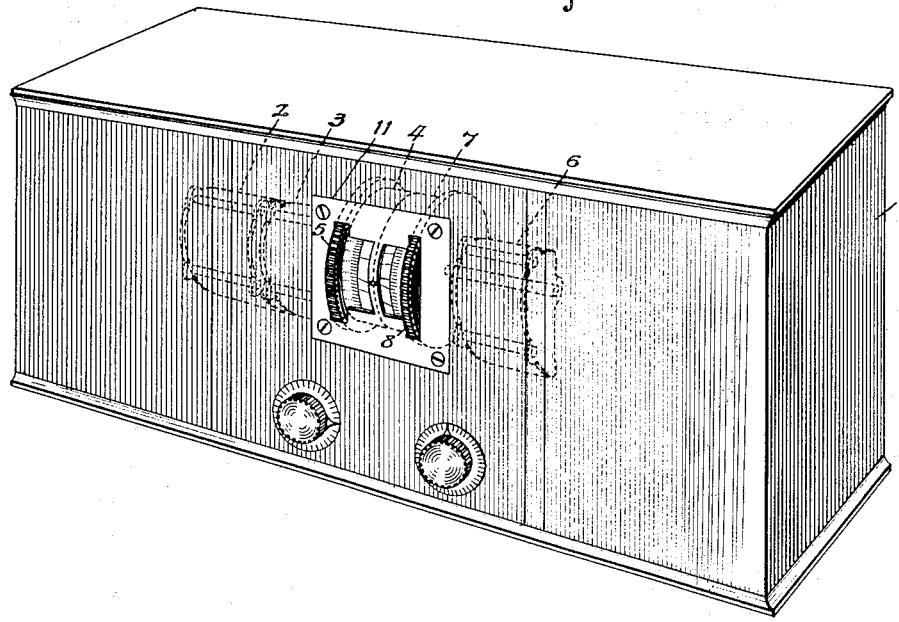
Figure 2:
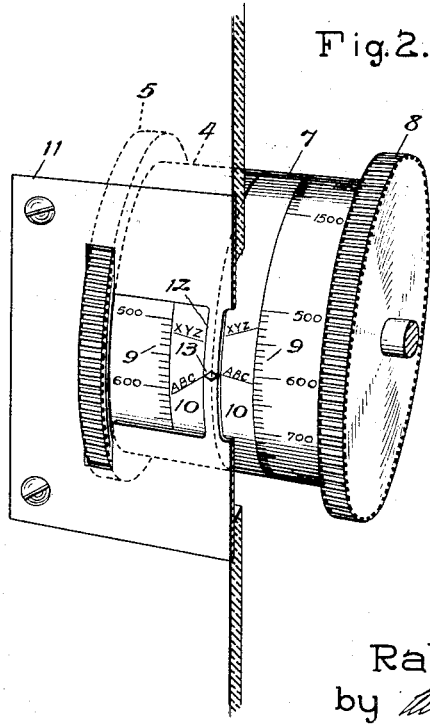

The novel features which I believe to be characteristic of my invention are set forth with particularity in the appended claims, my invention itself, however, both as to its organization and method of operation will best be understood by reference to the following description taken in connection with the accompanying drawing in which Fig. 1 is a perspective view of a receiving set in which my invention is embodied, and Fig. 2 is a view of the indication portion of the set.

I have indicated in the drawing a receiving set which in this particular case may be of the super-heterodyne type. This receiving set comprises a cabinet 1, in which the receiving apparatus is mounted. The apparatus within the cabinet comprises two tuning condensers 2 and 3 which are indicated by dotted lines. These condensers may be mounted on a shaft extending parallel to the plane of the front of the cabinet. The two condensers may be controlled simultaneously by means of a drum 4 having an operating wheel 5, a portion of which extends through an opening in the front of the cabinet. A third condenser 6 adapted to control the frequency of the local oscillations may be operated by a second drum 7, which also has a wheel 8, a portion of which projects through an opening in the front of the cabinet. The two drums 4 and 7 are provided with scales 9 graduated to indicate the frequency of the signals to be received, preferably in kilocycles. Since at the present time broadcasting stations are separated in frequency by a difference of ten kilocycles each division on the scale may conveniently be made to represent a difference of ten kilocycles in frequency.

Each drum may also carry a marking strip 10, having one edge adjacent the corresponding scale. A suitable cover plate 11, which is secured to the front of the cabinet has openings cut therein through which the wheels 5 and 8 project and through which a portion of the scales and marking strips are visible. The two drums are mounted adjacent one another and a bridge member 12 on the cover plate 11 conceals the small gap between the two drums. This bridge piece 12 also carries a suitable fixed index or pointer 13.

Because of difficulties in manufacture it is not always possible to so adjust the receiving apparatus that the index will always point to the exact frequency on the scale for which the set is adjusted. The marking strips 10 provide a means whereby this difficulty may be overcome and the receiving operator may make an indication whereby he will be enabled at will to adjust the set for the reception of signals from any particular station or of any particular frequency. Each marking strip is so arranged and located that it forms a field between the pointer or index and the scale, for affixing calibrating lines to visibly join the indicator with a signal frequency indication on the scale. The calibration of the apparatus or the set may by this means be effected by the operator while the apparatus or set is in operation. To provide such a calibration of the indicating apparatus the operator will adjust the set to receive a particular station and will then draw calibration lines on the marking strips to visibly join the index or pointer 13 with a scale division representing the frequency of the particular station which he is receiving, which is the frequency to which the apparatus is then adjusted. He may then, if desired, mark on each line the call letters of that particular station. After this has been done for all of the stations in the broadcast range, or all of the stations to which it is desired to listen, the operator can at will adjust the condensers until the index 13 points to the line drawn for a particular station, and he will then known that the set is properly adjusted to receive that station in case it is operating. The two drums 4 and 7 may be connected together by a suitable friction connection so that both of them may be operated by a movement of either of the wheels 5 or 8. In most cases it will be found that over a wide range a complete adjustment of the set may be made in this way. In case, however, when the adjustment has been made in this way the index does not point to the lines on both marking strips indicating the desired station, one of the wheels may be held by one hand while the other wheel is turned with the other hand to make the final adjustment.

While I have shown and described a preferred embodiment of my invention, it will be apparent that many modifications therein may be made without departing from the scope thereof as set forth in the appended claims.

What I claim as new and desire to secure by Letters Patent of the United States, is:—

1. The combination in a signal receiving apparatus adapted to receive high frequency signals over a predetermined frequency range, of a movable element adapted to adjust said apparatus for the reception of signals of any frequency within the predetermined range, a scale carried by said movable element, a fixed pointer cooperating with the scale, a marking strip carried by said movable element, said strip being located between the scale and fixed pointer.

2. The combination in a signal receiving apparatus adapted to receive high frequency signals over a predetermined frequency range of a movable element adapted to adjust said apparatus for the reception of signals of any frequency within the predetermined range, a drum carried by said movable element, a scale on said drum which is graduated to indicate signal frequencies, a marking strip carried by said drum adjacent said scale, and a fixed pointer located adjacent said marking strip on the opposite side thereof from the scale.

3. The combination in a signal receiving apparatus adapted to receive high frequency signals over a predetermined frequency range of a movable element adapted to adjust said apparatus for the reception of signals of any frequency within the predetermined range, a drum carried by said movable element, a scale on said drum which is graduated to indicate signal frequencies, a fixed pointer located adjacent said drum, and a marking strip carried by said drum and located between said scale and said fixed pointer.

4. The combination in a signal receiving apparatus adapted to receive high frequency signals over a predetermined frequency range, of a movable element adapted to adjust said apparatus for the reception of signals of any frequency within the predetermined range, a panel, said movable element being mounted on the rear of said panel, a scale carried by said movable element, a portion of said scale being visible from the front of said panel, a fixed pointer cooperating with the scale, a marking strip carried by said movable element adjacent said scale, said strip being located between the scale and fixed pointer.

5. The combination in a signal receiving apparatus adapted to receive high frequency signals over a predetermined frequency range, of a movable element adapted to adjust said apparatus for the reception of signals of any frequency within the predetermined range, a panel, said movable element being mounted on the rear of said panel, a scale carried by said movable element, said scale being graduated to indicate signal frequencies and a portion thereof being visible from the front of said panel, a marking strip carried by said movable element adjacent said scale and a fixed pointer carried by said panel and located adjacent said marking strip, said marking strip being located between said pointer and scale, whereby the marking strip forms a field for affixing calibrating lines to visibly join the indicator with a signal frequency indication on the scale corresponding to the frequency to which the apparatus is adjusted by said movable element.

6. The combination in a signal receiving apparatus adapted to receive high frequency signals over a predetermined frequency range, of a movable element adapted to adjust said apparatus for the reception of signals of any frequency within the predetermined range, a panel having an opening, said movable element being mounted on the rear of said panel, a scale carried by said movable element, said scale being graduated to indicate signal frequencies and being so mounted that it is adapted to move past the opening in said panel, a marking strip carried by said movable element adjacent said scale and a fixed pointer carried by said panel and located adjacent said marking strip, said marking strip being located between said pointer and scale, whereby the marking strip forms a field for affixing calibrating lines to visibly join the indicator with a signal frequency indication on the scale corresponding to the frequency to which the apparatus is adjusted by said movable element.

7. The combination in a signal receiving apparatus adapted to receive high frequency signals over a predetermined frequency range, of a movable element adapted to adjust said apparatus for the reception of signals of any frequency within the predetermined range, a panel, said movable element being mounted on the rear of said panel, a scale carried by said movable element, a portion of said scale being visible from the front of said panel, a fixed pointer carried by said panel and a marking strip carried by said movable element and located between said scale and said fixed pointer.

8. An indicating device for a signal receiving apparatus comprising a movable scale, a single fixed pointer for the scale, and a movable marking strip located between said scale and said pointer.

9. An indicating device for a signal receiving apparatus comprising a movable scale which is graduated to indicate signal frequencies, a single fixed pointer for the scale, and a movable marking strip located between said scale and said pointer.

10. An indicating device for a signal receiving apparatus comprising a rotatable drum, a scale on said drum which is graduated to indicate signal frequencies, a marking strip adjacent said scale and carried by said drum and a fixed pointer located adjacent said marking strip and separated from the scale by said said strip.

11. A signal receiving apparatus adapted to receive high frequency signals over a predetermined frequency range comprising a panel, a movable frequency response adjusting element mounted on the back of said panel, a drum carried by said element and having an axis of rotation substantially parallel to said panel, said drum having a portion which projects through the panel, a scale on said drum which is graduated to indicate signal frequencies, a marking strip which is adjacent said scale and which is supported on the surface of said drum, and a fixed pointer carried by the front of said panel and located adjacent said marking strip on the opposite side thereof from the scale whereby the pointer and the scale may be joined by calibrating lines affixed to the marking strip.

12. A signal receiving apparatus adapted to receive high frequency signals over a predetermined frequency range, comprising a panel, a pair of movable elements adapted to adjust said apparatus for the reception of signals of any frequency within the predetermined range, said movable elements being mounted on the rear of said panel, a pair of drums carried by said movable elements and having axes of rotation substantially parallel to said panel, each of said drums having a portion which projects through said panel, a scale on each of said drums which is graduated to indicate signal frequencies, marking strips on each of said drums which are located adjacent said scales and are supported on the surfaces of said drums between said scales, and a fixed pointer carried by said panel and located between portions of said marking strips which are visible from the front of the panel.

13. In a signal receiving apparatus, the combination of a scale member having scale lines thereon indicating a characteristic of a signal to be received, an indicator cooperating with the scale member, one of said members being movable, said scale member being provided with a marking strip between the scale lines and the indicator whereby calibration of the scale may be effected by an indicating mark on the strip joining a scale line and the indicator.

14. In a signal receiving apparatus the combination of a panel having an opening therein, a fixed indicator associated with the opening and a dial member having a surface movable past said opening, said surface being marked with a scale denoting a characteristic of a signal to be received, said dial and indicator being so arranged with respect to one another that calibration of said scale for an evaluation of the characteristic of any signal to be received may be effected by affixing a linear mark to the dial surface to visibly join the indicator and the scale.

15. In a signal receiving apparatus, the combination of a scale member having scale lines thereon indicating a characteristic of a signal to be received, an indicator cooperating with the scale member, one of said members being movable, said scale member being provided with a marking strip between the scale lines and the indicator whereby calibration of the scale for an evaluation of the characteristic of any received signal may be effected by affixing a linear mark to the scale member to visibly join the indicator and a scale line indicating such evaluation.

In witness whereof, I have hereunto set my hand this 30th day of November, 1925.

RALPH H. LANGLEY.